US012592395B2

(12) United States Patent
Saito et al.

(10) Patent No.: US 12,592,395 B2
(45) Date of Patent: Mar. 31, 2026

(54) LITHIUM PRIMARY BATTERY AND LIQUID NON-AQUEOUS ELECTROLYTE FOR LITHIUM PRIMARY BATTERY

(71) Applicant: Panasonic Intellectual Property Management Co., Ltd., Osaka (JP)

(72) Inventors: Kohei Saito, Osaka Fu (JP); Takayuki Nakatsutsumi, Osaka Fu (JP); Atsushi Fukui, Hyogo Ken (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 741 days.

(21) Appl. No.: 17/913,538

(22) PCT Filed: Dec. 10, 2020

(86) PCT No.: PCT/JP2020/045962
§ 371 (c)(1),
(2) Date: Sep. 22, 2022

(87) PCT Pub. No.: WO2021/192440
PCT Pub. Date: Sep. 30, 2021

(65) Prior Publication Data
US 2023/0109610 A1 Apr. 6, 2023

(30) Foreign Application Priority Data
Mar. 25, 2020 (JP) ................................. 2020-055056

(51) Int. Cl.
| | |
|---|---|
| *H01M 6/16* | (2006.01) |
| *H01M 4/06* | (2006.01) |
| *H01M 4/38* | (2006.01) |
| *H01M 4/505* | (2010.01) |
| *H01M 4/66* | (2006.01) |
| *H01M 6/14* | (2006.01) |

(52) U.S. Cl.
CPC ............. *H01M 6/168* (2013.01); *H01M 4/06* (2013.01); *H01M 4/382* (2013.01); *H01M 4/505* (2013.01); *H01M 4/669* (2013.01); *H01M 6/14* (2013.01); *H01M 2300/0025* (2013.01)

(58) Field of Classification Search
CPC ........ H01M 6/168; H01M 4/06; H01M 4/505; H01M 6/14; H01M 4/382; H01M 10/0567; H01M 4/50; H01M 4/502; H01M 2004/028
See application file for complete search history.

(56) References Cited

U.S. PATENT DOCUMENTS

| | | | |
|---|---|---|---|
| 6,641,957 B1 | 11/2003 | Kawaguchi et al. | |
| 2002/0081496 A1 | 6/2002 | Tsujioka et al. | |
| 2008/0193854 A1 | 8/2008 | Yamaguchi et al. | |
| 2014/0193706 A1 | 7/2014 | Morinaka et al. | |
| 2015/0221984 A1 | 8/2015 | Fujita et al. | |
| 2016/0248121 A1* | 8/2016 | Uematsu ........... | H01M 10/0567 |
| 2017/0358791 A1* | 12/2017 | Sugioka ................ | H01M 6/168 |
| 2018/0309139 A1 | 10/2018 | Sugioka et al. | |
| 2021/0104725 A1 | 4/2021 | Nakai et al. | |

FOREIGN PATENT DOCUMENTS

| | | | |
|---|---|---|---|
| JP | S61-281466 A | | 12/1986 |
| JP | 2000-294231 A | | 10/2000 |
| JP | 2000-294273 | * | 10/2000 |
| JP | 2000-294273 A | | 10/2000 |
| JP | 2002-110235 A | | 4/2002 |
| JP | 2006-236889 A | | 9/2006 |
| JP | 2007-123097 A | | 5/2007 |
| JP | 2007-257961 A | | 10/2007 |
| JP | 2009-123549 A | | 6/2009 |
| JP | 2012-190669 A | | 10/2012 |
| JP | 2013-016347 A | | 1/2013 |
| JP | 2013-051122 A | | 3/2013 |
| JP | 2015-022985 A | | 2/2015 |
| JP | 2015-149140 | * | 8/2015 |
| JP | 2015-149140 A | | 8/2015 |
| JP | 2016-189327 A | | 11/2016 |
| JP | 2018-170276 | * | 11/2018 |
| JP | 2018-170276 A | | 11/2018 |

(Continued)

OTHER PUBLICATIONS

International Search Report dated Feb. 22, 2021, issued in counterpart Application No. PCT/JP2020/045962, with English translation. (5 pages).

(Continued)

*Primary Examiner* — Laura Weiner
(74) *Attorney, Agent, or Firm* — WHDA, LLP

(57) ABSTRACT

A lithium primary battery includes a positive electrode, a negative electrode, and a liquid non-aqueous electrolyte. The positive electrode contains a positive electrode material mixture including $LixMnO_2$ where $0 \leq x \leq 0.05$. The negative electrode contains at least one of metal lithium and a lithium alloy. The liquid non-aqueous electrolyte contains a cyclic imide component and an organic silyl borate component. The concentration of the cyclic imide component in the liquid non-aqueous electrolyte is 1 mass % or less, the concentration of the organic silyl borate component in the liquid non-aqueous electrolyte is 5.5 mass % or less, and the mass ratio of the cyclic imide component to the organic silyl borate component contained in the liquid non-aqueous electrolyte is 0.02 or more and 10 or less.

13 Claims, 1 Drawing Sheet

(56)     References Cited

FOREIGN PATENT DOCUMENTS

| WO | 01/41247 A1 | 6/2001 |
| WO | WO 01/41247 | * 6/2001 |
| WO | 2017/169684 A1 | 10/2017 |
| WO | 2018/179935 A1 | 10/2018 |
| WO | 2020/012718 A1 | 1/2020 |
| WO | 2020/026525 A1 | 2/2020 |
| WO | WO 2020/026525 | * 2/2020 |

OTHER PUBLICATIONS

Written Opinion dated Feb. 22, 2021, issued in counterpart Appication No. PCT/JP2020/045962. (3 pages).

Office Action dated Nov. 30, 2024, issued in counterpart CN application No. 202080098946.X, with partial English translation. (8 pages).

Final Office Action dated Oct. 1, 2025, issued in U.S. Appl. No. 17/793,549 (19 pages).

* cited by examiner

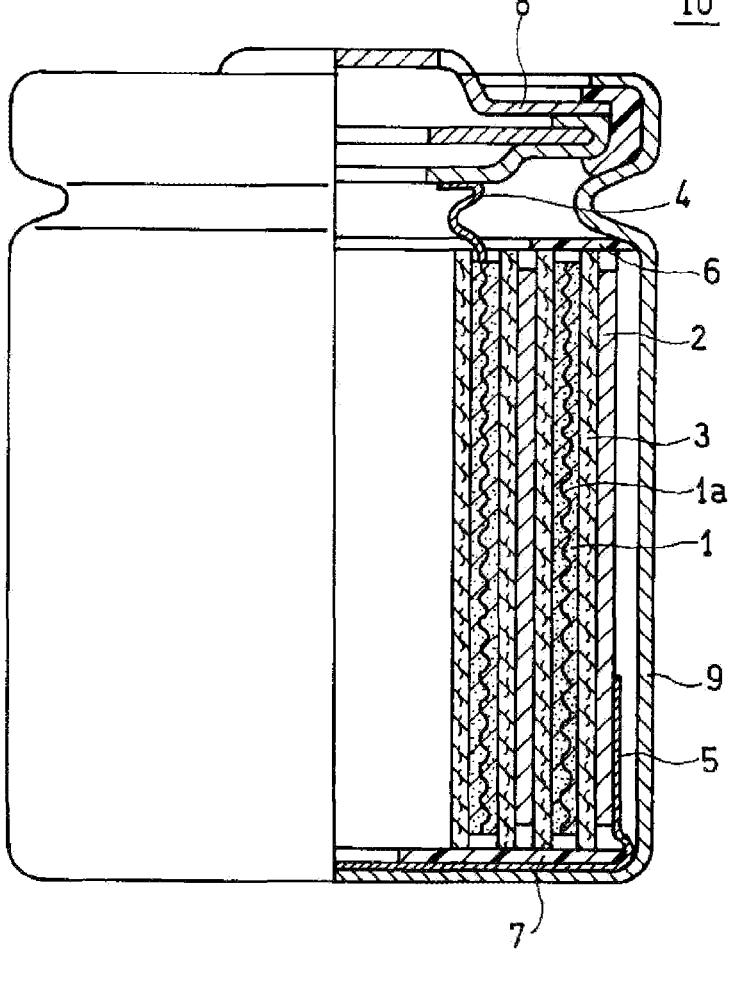

LITHIUM PRIMARY BATTERY AND LIQUID NON-AQUEOUS ELECTROLYTE FOR LITHIUM PRIMARY BATTERY

CROSS-REFERENCE TO RELATED APPLICATIONS

This application is a national stage of International Application No. PCT/JP2020/045962, filed Dec. 10, 2020, which claims priority to Japanese Patent Application No. 2020-055056 filed Mar. 25, 2020 both of which are hereby incorporated by reference in their entirety.

TECHNICAL FIELD

The present disclosure relates to a liquid non-aqueous electrolyte for a lithium primary battery, and a lithium primary battery.

BACKGROUND ART

Lithium primary batteries have high energy density and low self-discharge, and are used in many electronic devices. A lithium primary battery includes a negative electrode containing metal lithium, a positive electrode, and a liquid non-aqueous electrolyte. The positive electrode includes, as an active material, graphite fluoride, manganese dioxide, thionyl chloride or the like.

In a lithium primary battery, as the discharge proceeds, the internal resistance increases, and the discharge capacity decreases, in some cases. In view of suppressing such an increase in internal resistance, it has been proposed to use an additive in the electrolyte.

For example, Patent Literature 1 proposes using a non-aqueous electrolyte containing an additive, such as phthalimide, in view of suppressing the increase in internal resistance of a primary or secondary battery and improving the charge-discharge cycle characteristics of a secondary battery.

Patent Literature 2 proposes using a liquid non-aqueous electrolyte for a liquid non-aqueous electrolyte primary battery, in which a phosphoric acid compound or a boric acid compound having, in its molecule, a silyl group having an alkyl group, an alkenyl group, an aryl group or the like is contained in a content of 8 mass % or less.

Patent Literature 3 proposes an additive composition for a liquid electrolyte for a non-aqueous power storage device. The composition includes an additive comprising a compound (A) in which at least one of the acidic protons in a protonic acid having a phosphorus atom or a boron atom is substituted by a silyl group having three hydrocarbon groups.

CITATION LIST

Patent Literature

[PTL 1] International Publication WO 01/41247
[PTL 2] International Publication WO 2017/169684
[PTL 3] Japanese Laid-Open Patent Publication No. 2016-189327

SUMMARY OF INVENTION

A lithium primary battery is in some cases stored for a long time, and is required to exhibit excellent discharge performance even after the storage. When a liquid non-aqueous electrolyte including phthalimide is used in a lithium primary battery, the discharge capacity in a low temperature environment after the battery is stored decreases in some cases.

A first aspect of the present disclosure relates to a lithium primary battery, including: a positive electrode; a negative electrode; and a liquid non-aqueous electrolyte, wherein the positive electrode contains a positive electrode material mixture including $Li_xMnO_2$ where $0 \leq x \leq 0.05$, the negative electrode contains at least one of metal lithium and a lithium alloy, the liquid non-aqueous electrolyte contains a cyclic imide component and an organic silyl borate component, a concentration of the cyclic imide component in the liquid non-aqueous electrolyte is 1 mass % or less, a concentration of the organic silyl borate component in the liquid non-aqueous electrolyte is 5.5 mass % or less, and a mass ratio of the cyclic imide component to the organic silyl borate component contained in the liquid non-aqueous electrolyte is 0.02 or more and 10 or less.

A second aspect of the present disclosure relates to a lithium primary battery, including: a positive electrode; a negative electrode; and a liquid non-aqueous electrolyte, wherein the positive electrode contains a positive electrode material mixture including $Li_xMnO_2$ where $0 \leq x \leq 0.05$, the negative electrode contains at least one of metal lithium and a lithium alloy, the liquid non-aqueous electrolyte contains a cyclic imide component and an organic silyl borate component, a concentration of the cyclic imide component in the liquid non-aqueous electrolyte is 0.1 mass % or more and 1 mass % or less, and a concentration of the organic silyl borate component in the liquid non-aqueous electrolyte is 0.1 mass % or more and 5.5 mass % or less.

A third aspect of the present disclosure relates to a liquid non-aqueous electrolyte for a lithium primary battery including a positive electrode containing a positive electrode material mixture including $Li_xMnO_2$ where $0 \leq x \leq 0.05$, a negative electrode containing at least one of metal lithium and a lithium alloy, and a liquid non-aqueous electrolyte, the liquid non-aqueous electrolyte including: a cyclic imide component; and an organic silyl borate component, wherein a concentration of the cyclic imide component in the liquid non-aqueous electrolyte is 0.1 mass % or more and 1 mass % or less, and a concentration of the organic silyl borate component in the liquid non-aqueous electrolyte is 0.1 mass % or more and 5.5 mass % or less.

The decrease in discharge capacity in a low temperature environment after the lithium primary battery is stored can be suppressed.

BRIEF DESCRIPTION OF DRAWING

FIG. 1 A front view, partially in section, of a lithium primary battery according to one embodiment of the present disclosure.

DESCRIPTION OF EMBODIMENTS

In a lithium primary battery including a positive electrode containing $Li_xMnO_2$ where $0 \leq x \leq 0.05$, and a negative electrode containing at least one of metal lithium and a lithium alloy, when using a liquid non-aqueous electrolyte that contains a cyclic imide component, as compared to when using a liquid non-aqueous electrolyte that does not contain a cyclic imide component, the discharge capacity of the battery after storage decreases significantly in some cases. Such a decrease in discharge capacity tends to be apparent when the battery is discharged at low temperatures. The decrease in discharge capacity becomes particularly significant when the battery is stored at high temperatures, especially when stored at high temperatures for a long time. Recently, with the expansion of applications of lithium primary batteries, there are some cases where excellent discharge performance is required even when the battery is stored over a long period (e.g., a long period of 10 years or more or 20 years or more), or even when the battery is discharged at low temperatures after storage.

In view of the above, a lithium primary battery of the present disclosure includes a positive electrode containing a positive electrode material mixture including LixMnO$_2$ where 0≤x≤0.05, a negative electrode containing at least one of metal lithium and a lithium alloy, and a liquid non-aqueous electrolyte. The liquid non-aqueous electrolyte contains a cyclic imide component and an organic silyl borate component. In such a lithium primary battery, the liquid non-aqueous electrolyte satisfies at least one of the following conditions (a) and (b).

(a) The concentration of the cyclic imide component in the liquid non-aqueous electrolyte is 1 mass % or less, the concentration of the organic silyl borate component in the liquid non-aqueous electrolyte is 5.5 mass % or less, and the mass ratio of the cyclic imide component to the organic silyl borate component contained in the liquid non-aqueous electrolyte is 0.02 or more and 10 or less.

(b) The concentration of the cyclic imide component in the liquid non-aqueous electrolyte is 0.1 mass % or more and 1 mass % or less, and the concentration of the organic silyl borate component in the liquid non-aqueous electrolyte is 0.1 mass % or more and 5.5 mass % or less.

According to the present disclosure, since the lithium primary battery includes the liquid non-aqueous electrolyte as described above, despite the inclusion of a cyclic imide component in the liquid non-aqueous electrolyte, the decrease in discharge capacity when the lithium primary battery is discharged at low temperatures after storage can be suppressed. Especially, the decrease in discharge capacity when the lithium primary battery is discharged in a low temperature environment after storage at high temperatures for a long time can be suppressed. Such an effect can be obtained in the present disclosure presumably for the following reasons.

In a lithium primary battery including the above positive electrode, the above negative electrode, and a liquid non-aqueous electrolyte, when the liquid non-aqueous electrolyte does not contain an organic silyl borate component and contains a cyclic imide component, as compared to when neither a cyclic imide component nor an organic silyl borate component is contained, the capacity after storage decreases significantly. This is presumably because the cyclic imide component is oxidized at the surface of the positive electrode, and a surface film with low lithium ion conductivity derived from the cyclic imide component is formed on the positive electrode, which inhibits the transfer of lithium ions at the interface between the positive electrode and the liquid electrolyte. The influence of this inhibition of lithium ion transfer appears more remarkably during the discharge in a low temperature environment. In other words, in a low temperature environment, the lithium ion transfer at the interface between the positive electrode and the liquid electrolyte tends to determine the rate of the discharge. Therefore, the discharge capacity in a low temperature environment decreases more significantly. In addition, the self-discharge of the positive electrode proceeds with the oxidation of the cyclic imide component, and this causes the discharge capacity after storage to decrease. Especially when the lithium primary battery is stored at high temperatures for a long time, the growth of the surface film on the positive electrode and the self-discharge of the positive electrode are facilitated, causing a more significant decrease in discharge capacity when the battery is discharged in a low temperature environment after storage.

The decrease in capacity after storage shows almost no difference between when the liquid non-aqueous electrolyte does not contain a cyclic imide component and contains an organic silyl borate component and when it contains neither a cyclic imide component nor an organic silyl borate component. It can be inferred from this that the organic silyl borate component alone hardly affects the lithium ion conductivity of the surface film on the positive electrode.

On the other hand, in the lithium primary battery of the present disclosure, the decrease in discharge capacity in a low temperature environment after storage can be considerably suppressed, as compared to when neither a cyclic imide component nor an organic silyl borate component is contained. In the lithium primary batteries of the present disclosure, the decrease in capacity in a low temperature environment after storage can be more remarkably suppressed than that predicted from when the liquid non-aqueous electrolyte contains either a cyclic imide component or an organic silyl borate component. This indicates that when the liquid non-aqueous electrolyte satisfies at least one of the above conditions (a) and (b), in suppressing the decrease in discharge capacity in a low temperature environment after storage, the synergistic effect by the cyclic imide component and the organic silyl borate component is exerted. Although not necessarily clear, the followings are considered as the factors why the decrease in discharge capacity in a low temperature environment after storage is considerably suppressed as described above in the lithium primary battery of the present disclosure. When the cyclic imide component is decomposed at the surface of the positive electrode to form a surface film, the organic silyl borate component is also involved in the decomposition reaction, to form a surface film containing components derived from both the cyclic imide component and the organic silyl borate component. When such a surface film is formed, unlike when a surface film composed only of the cyclic imide component is formed, a surface film having excellent lithium ion conductivity is formed. This surface film can serve to maintain a high discharge capacity even in a low temperature environment where, usually, the lithium ion transfer at the interface between the positive electrode and the liquid electrolyte tends to determine the rate of the discharge. Furthermore, the surface film containing components derived from both the cyclic imide component and the organic silyl borate component is dense and has low electron conductivity. After the surface film is formed on the positive electrode in the early stage of battery fabrication, the oxidation of the cyclic imide component is less likely to proceed, and the progress of the reduction of the positive electrode is slowed. As a result, the self-discharge of the lithium primary battery during storage is reduced. It is considered therefore that, by using the liquid electrolyte containing both the cyclic imide component and the organic silyl borate component, the decrease in discharge capacity after the battery is stored can be suppressed. This effect is extremely remarkable in a low temperature environment.

The present disclosure also encompasses a liquid non-aqueous electrolyte for a lithium primary battery. The battery includes a positive electrode containing a positive electrode material mixture including $LixMnO_2$ where $0 \leq x \leq 0.05$, a negative electrode containing at least one of metal lithium and a lithium alloy, and a liquid non-aqueous electrolyte. The liquid non-aqueous electrolyte contains a cyclic imide component and an organic silyl borate component. The liquid non-aqueous electrolyte satisfies the above condition (b). The present disclosure also encompasses the use of such a liquid non-aqueous electrolyte in a lithium primary battery including a positive electrode containing a positive electrode material mixture including $LixMnO_2$ where $0 \leq x \leq 0.05$, a negative electrode containing at least one of metal lithium and a lithium alloy, and a liquid non-aqueous electrolyte.

In the following, the lithium primary battery and the liquid non-aqueous electrolyte of the present disclosure, and a method for producing the lithium primary battery will be more specifically described.

[Lithium Primary Battery]

(Positive Electrode)

The positive electrode contains a positive electrode material mixture. The positive electrode material mixture contains a positive electrode active material. As the positive electrode active material contained in the positive electrode, manganese dioxide is exemplified. The positive electrode containing manganese dioxide develops a relatively high voltage and is excellent in pulse discharge characteristics. The manganese dioxide may be in a mixed crystal state including two or more crystal states. The positive electrode may contain a manganese oxide other than manganese dioxide. Examples of the manganese oxide other than manganese dioxide include MnO, $Mn_3O_4$, $Mn_2O_3$, and $Mn_2O_7$. It is preferable that the main component of the manganese oxide contained in the positive electrode is manganese dioxide.

The manganese dioxide contained in the positive electrode may be partially doped with lithium. When the amount of doped lithium is small, a high capacity can be ensured. The manganese dioxide and the manganese dioxide doped with a small amount of lithium can be represented by $LixMnO_2$ where $0 \leq x \leq 0.05$. Here, the average composition of the whole manganese oxide contained in the positive electrode is represented by $LixMnO_2$ where $0 \leq x \leq 0.05$. The ratio x of Li is 0.05 or less when the lithium primary battery is in the early stage of discharge. The ratio x of Li typically increases as the discharge of the lithium primary battery proceeds. The oxidation number of the manganese contained in manganese dioxide is theoretically 4. However, when another manganese oxide is included in the positive electrode or the manganese dioxide is doped with lithium, the oxidation number of the manganese sometimes slightly increases or decreases from 4. Therefore, in $LixMnO_2$, a slight increase or decrease of the average oxidation number of the manganese from 4 is permissible.

The positive electrode can contain, in addition to $LixMnO_2$, another positive electrode active material as used in a lithium primary battery. Examples of the other positive electrode active material include graphite fluoride. In view of allowing the effect of using the liquid non-aqueous electrolyte satisfying the above conditions (a) or (b) to be easily exerted, the proportion of $LixMnO_2$ occupying the whole positive electrode active material is preferably 90 mass % or more.

As the manganese dioxide, an electrolytic manganese dioxide is preferably used. An electrolytic manganese dioxide having been subjected to at least one of neutralization treatment, cleaning treatment, and baking treatment, as needed, may be used.

The electrolytic manganese dioxide is typically obtained through electrolysis of an aqueous solution of manganese sulfate. Therefore, sulfate ions are inevitably contained in the electrolytic manganese dioxide. In a positive electrode material mixture prepared using such an electrolytic manganese dioxide, sulfur atoms are inevitably contained. In a lithium primary battery, the sulfate ions interact with the unstable $Mn^{3+}$ produced in association with the intercalation of lithium into $LixMnO_2$, to suppress the production of $Mn^{2+}$ resulted from disproportionation of $Mn^{3+}$. This can suppress the leaching of $Mn^{2+}$ into the liquid non-aqueous electrolyte and the deposition of Mn at the negative electrode. In the lithium primary battery of the present disclosure, since the liquid non-aqueous electrolyte contains a cyclic imide component and an organic silyl borate component, when sulfur atoms are contained in the positive electrode material mixture, the sulfur atoms react with the cyclic imide component and the organic silyl borate component, to form a surface film containing sulfur atoms. By this surface film, the $Mn^{2+}$ leaching suppression effect can be enhanced.

The amount of sulfur atoms contained in the positive electrode material mixture may be 0.05 parts by mass or more and 3 parts by mass or less, relative to 100 parts by mass of manganese atoms contained in the positive electrode material mixture. When the amount of sulfur atoms is in such a range, a higher effect can be ensured in suppressing the leaching of $Mn^{2+}$. This can ensure a high reliability of the lithium primary battery, while ensuring a high capacity. The proportion of sulfur atoms in the positive electrode material mixture can be adjusted by adjusting the condition for the washing treatment and the neutralization treatment. The cleaning treatment may be, for example, at least one of washing with water and cleaning with acid. As the neutralizing agent used for the neutralization treatment, for example, an inorganic base, such as ammonia and hydroxide can be used.

On the other hand, in a lithium secondary battery, since part of the sulfate ions are decomposed in the charging process, it is difficult to sufficiently ensure the effects as above even though a sulfate is included in such an amount that the sulfur atoms are to be contained in the above range in the positive electrode material mixture.

By adjusting the conditions at the time of electrolytic synthesis, the crystallinity of the manganese dioxide can be increased, and an electrolytic manganese dioxide with small specific surface area can be obtained. The BET specific surface area of $LixMnO_2$ may be 20 $m^2/g$ or more and 50 $m^2/g$ or less. When the BET specific surface area of $LixMnO_2$ is in the range above, in a lithium primary battery, the voltage drop at the time of pulse discharge can be suppressed, and enhanced suppression effect of self-discharge can be obtained, leading to a reduced gas generation. In addition, the positive electrode material mixture layer can be easily formed.

The BET specific surface area of $LixMnO_2$ can be measured by a known method, and is measured, for example, using a specific surface area meter (e.g., available from Mountech Co., Ltd.), based on the BET method. For example, the $Li_xMnO_2$ separated from the positive electrode taken out from the battery is used as a measurement sample.

The median particle diameter of $Li_xMnO_2$ may be 10 μm or more and 40 μm or less. When the median particle diameter is in the range above, in the lithium primary battery, the effect of suppressing the self-discharge during discharge can be further enhanced, and gas generation can be reduced, and also, the voltage drop at the time of pulse discharge can be suppressed.

The median particle diameter of $Li_xMnO_2$ is, for example, a median of the particle size distribution obtained by a quantitative laser diffraction scattering method (qLD method). For example, the $Li_xMnO_2$ separated from the positive electrode taken out from the battery is used as a measurement sample. For the measurement, for example, SALD-7500 nano available from Shimadzu Corporation can be used.

The positive electrode material mixture may contain a binder, in addition to the positive electrode active material. The positive electrode material mixture may contain an electrically conductive agent.

Examples of the binder include fluorocarbon resin, rubber particles, and acrylic resin.

Examples of the conductive agent include a conductive carbon material. Examples of the conductive carbon material include natural graphite, artificial graphite, carbon black, and carbon fibers.

The positive electrode can further include a positive electrode current collector that holds the positive electrode material mixture. As the material of the positive electrode current collector, stainless steel, aluminum, titanium, and the like are exemplified.

When the battery is of a coin type, the positive electrode may be constituted by attaching a ring-like positive electrode current collector having an L-shaped cross section to a pellet of positive electrode material mixture, or may be constituted of a pellet of positive electrode material mixture only. The pellet of positive electrode material mixture can be obtained by, for example, compression-molding a wet-state positive electrode material mixture prepared by adding an appropriate amount of water to the positive electrode active material and the additive, and drying the molded material.

When the battery is of a cylindrical type, a positive electrode including a sheet-like positive electrode current collector, and a positive electrode material mixture layer held on the positive electrode current collector can be used. As the sheet-like positive electrode current collector, a current collector with pores is preferred. Examples of the current collector with pores include an expanded metal, a net, and a punched metal. The positive electrode material mixture layer can be obtained by, for example, applying the aforementioned wet-state positive electrode material mixture to a surface of the sheet-like positive electrode current collector, and applying a pressure thereto in the thickness direction, followed by drying.

The positive electrode preferably includes a current collector with pores as described above, and a positive electrode material mixture filled in the current collector. In particular, it is preferable to use a current collector including at least one material selected from the group consisting of SUS444, SUS430, and SUS316. By using such a current collector, in a lithium primary battery, the side reaction with the aforementioned liquid non-aqueous electrolyte and the corrosion of the current collector can be suppressed, and the increase in internal resistance and the gas generation can be suppressed. Especially when such a current collector is combined with a liquid non-aqueous electrolyte containing at least one of $LiCF_3SO_3$ and $LiClO_4$ as described later, which are typically used as a lithium salt in a lithium primary battery, the side reaction between the current collector and the liquid non-aqueous electrolyte can be suppressed more effectively. The positive electrode has a thickness of, for example, 300 μm or more and 900 μm or less. When a positive electrode having such a thickness is used, the diffusibility of the liquid non-aqueous electrolyte in the positive electrode material mixture tends to decline, and the reduction of the positive electrode due to the oxidation of the solvent or the cyclic imide component is suppressed, and thus, the self-discharge can be suppressed. In a lithium primary battery, which is usually discharged at a low rate over a long period, an increase in resistance when the thickness of the positive electrode is in such a range is permissible.

(Negative Electrode)

The negative electrode may contain metal lithium or a lithium alloy, and may contain both metal lithium and a lithium alloy. For example, a composite containing metal lithium and a lithium alloy may be used for the negative electrode.

Examples of the lithium alloy include Li—Al alloy, Li—Sn alloy, Li—Ni—Si alloy, and Li—Pb alloy. The content of the metal element other than lithium in the lithium alloy is preferably 0.05 to 15 mass %, in view of ensuring the discharge capacity and stabilizing the internal resistance.

The metal lithium, the lithium alloy, or a composite of these are formed into a desired shape and thickness, according to the type, size, specified performance, and the like of the lithium primary battery.

When the battery is of a coin type, a hoop-like metal lithium, lithium alloy, or composite of these punched into a disc shape may be used as the negative electrode. When the battery is of a cylindrical type, a sheet of metal lithium, a lithium alloy, or a composite of these may be used as the negative electrode. The sheet can be obtained by, for example, extrusion molding. Specifically, in a cylindrical-type battery, a foil of the metal lithium or the metal alloy or the like having a shape having a longitudinal direction and a lateral direction is used.

When the battery is of a cylindrical type, a continuous tape including a resin base material and an adhesive layer may be attached on at least one principal surface of the negative electrode along the longitudinal direction. The principal surface means a surface facing the positive electrode. The width of the tape is set to, for example, 0.5 mm or more and 3 mm or less. The tape serves to prevent an occurrence of a failure in current collection due to a foil breakage in the negative electrode which may occur in the final stage of discharge when the lithium component in the negative electrode is consumed by the reaction. The occurrence of a failure in current collection leads to a decrease in battery capacity. However, the adhesive strength of the tape is reduced, during a long-time storage, due to the liquid electrolyte. With a liquid electrolyte containing a cyclic imide component and an organic silyl borate component, this reduction in adhesive strength can be suppressed, and the occurrence of a failure in current collection due to a foil breakage in the negative electrode can be more effectively reduced.

As the material of the resin base material, for example, fluorocarbon resin, polyimide, polyphenylene sulfide, polyethersulfone, polyolefin such as polyethylene and polypropylene, polyethylene terephthalate, and the like can be used. Preferred is a polyolefin, and more preferred is polypropylene.

The adhesive layer contains, for example, at least one component selected from the group consisting of a rubber component, a silicone component, and an acrylic resin component. Specifically, as the rubber component, a synthetic rubber, a natural rubber, and the like can be used. Examples of the synthetic rubber include butyl rubber, butadiene rubber, styrene-butadiene rubber, isoprene rubber, neoprene, polyisobutylene, acrylonitrile-butadiene rubber, styrene-isoprene block copolymer, styrene-butadiene block copolymer, and styrene-ethylene-butadiene block copolymer. As the silicone component, an organic compound having a polysiloxane structure, a silicone-series polymer, and the like can be used. Examples of the silicone-series polymer include a peroxide curing type silicone, and an addition reaction type silicone. As the acrylic resin component, a polymer having an acrylic monomer unit, such as acrylic acid, methacrylic acid, acrylic acid ester, and methacrylic acid ester can be used, examples of which include a homopolymer or a copolymer of acrylic monomers, such as acrylic acid, methacrylic acid, methyl acrylate, methyl methacrylate, ethyl acrylate, ethyl methacrylate, propyl acrylate, propyl methacrylate, butyl acrylate, butyl methacrylate, octyl acrylate, octyl methacrylate, 2-ethyl hexyl acrylate, and 2-ethylhexyl methacrylate. The adhesive layer may contain a crosslinking agent, a plasticizer, a tackifier, and the like.

(Liquid Non-Aqueous Electrolyte)

The liquid non-aqueous electrolyte contains, for example, a cyclic imide component and an organic silyl borate component, and a non-aqueous solvent dissolving them. The liquid non-aqueous electrolyte contains, a lithium salt or lithium ions. The cyclic imide component may be a salt, such as a lithium salt, and may be capable of producing cations, such as lithium ions. The liquid non-aqueous electrolyte may contain a lithium salt other than the cyclic imide component.

(Cyclic Imide Component)

As the cyclic imide component, for example, a cyclic diacylamine is exemplified. The cyclic imide component has a diacylamine ring (sometimes referred to as an imide ring). The imide ring may be condensed with another ring (sometimes referred to as a second ring). The liquid non-aqueous electrolyte may contain one kind or two or more kinds of cyclic imide components. The cyclic imide component may be contained in the liquid non-aqueous electrolyte in the form of an imide, or may be contained in the form of an anion or a salt. When the cyclic imide component is contained in the liquid non-aqueous electrolyte in the imide form, it may be contained in a form having a free NH group, or may be contained in the form of a tertiary amine.

Examples of the second ring include an aromatic ring, and a saturated or unsaturated aliphatic ring. The second ring may contain at least one heteroatom. Examples of the heteroatom include oxygen atom, sulfur atom, and nitrogen atom.

Examples of the cyclic imide constituting the cyclic imide component include an aliphatic dicarboxylic acid imide, and a cyclic imide having the second ring. As the aliphatic dicarboxylic acid imide, for example, succinimide and the like are exemplified. As the cyclic imide having the second ring, an imide of aromatic or alicyclic dicarboxylic acid and the like are exemplified. The aromatic dicarboxylic acid or the alicyclic dicarboxylic acid is exemplified by those having a carboxy group at each of two adjacent atoms constituting the ring. The cyclic imide having the second ring may be, for example, phthalimide, or a hydrogenated product of phthalimide. Examples of the hydrogenated product of phthalimide include cyclohex-3-ene-1,2-dicarboximide, and cyclohexane-1,2-dicarboximide.

The imide ring may be a N-substituted imide ring having a substituent on the nitrogen atom of the imide. Examples of such a substituent include a hydroxy group, an alkyl group, an alkoxy group, and a halogen atom. The alkyl group is exemplified by a $C_{1-4}$ alkyl group, and may be methyl group, ethyl group, or the like. The alkoxy group is exemplified by a $C_{1-4}$ alkoxy group, and may be methoxy group, ethoxy group, or the like. Examples of the halogen atom include chlorine atom and fluorine atom.

Preferred examples of the cyclic imide component include phthalimide and a N-substituted phthalimide. The substituent on the nitrogen atom of the N-substituted phthalimide can be selected from those exemplified for the N-substituted imide ring. More preferred is a cyclic imide component including at least phthalimide.

When the liquid non-aqueous electrolyte satisfies the above condition (a), the mass ratio of the cyclic imide component to the organic silyl borate component contained in the liquid non-aqueous electrolyte is 0.02 or more and 10 or less, more preferably 0.02 or more and 5 or less, and may be 0.02 or more and 2 or less, 0.02 or more and 1 or less, 0.02 or more and 0.7 or less, 0.08 or more and 0.7 or less, 0.02 or more and 0.5 or less, 0.08 or more and 0.5 or less, or 0.1 or more and 0.5 or less. When the mass ratio is in the range above, the formation of an oxide film derived only from the cyclic imide component is suppressed, and a surface film containing components derived from both the cyclic imide component and the organic silyl borate component is more likely to be formed on the positive electrode surface. Therefore, the lithium ion conductivity of the surface film is increased, and the effect of suppressing the self-discharge during storage is enhanced. As a result, the decrease in capacity in a low temperature environment after storage of the lithium primary battery can be remarkably suppressed.

The concentration of the cyclic imide component in the liquid non-aqueous electrolyte is 1 mass % or less, and may be 0.8 mass % or less, or 0.5 mass % or less. When the concentration of the cyclic imide component is in the range above, the decrease in capacity in a low temperature environment after the lithium primary battery is stored can be further suppressed. The concentration of the cyclic imide component in the liquid non-aqueous electrolyte may be any value equal to or higher than the detection limit, and may be 0.1 mass % or more.

During storage or discharge of the lithium primary battery, the cyclic imide component is consumed for the surface film formation and the like in the lithium primary battery, and the concentration of the cyclic imide component in the liquid non-aqueous electrolyte varies. The concentration of the cyclic imide component in the liquid non-aqueous electrolyte used for fabrication or manufacturing of the lithium primary battery is preferably set to 0.1 mass % or more. In this case, a surface film containing components derived from both the cyclic imide component and the organic silyl borate component is more likely to be formed, and the decrease in capacity in a low temperature environment after the lithium primary battery is stored can be effectively suppressed. The concentration of the cyclic imide component in the liquid non-aqueous electrolyte used for fabrication or manufacturing of the lithium primary battery is preferably set to 1 mass % or less, and may be set to 0.8 mass % or less, or 0.5 mass % or less. In this case, the effect of suppressing the self-discharge while the lithium primary battery is stored is further enhanced, and the decrease in capacity in a low temperature environment after storage can be remarkably suppressed.

When the liquid non-aqueous electrolyte satisfies the above condition (b), the concentration of the cyclic imide component in the liquid non-aqueous electrolyte is 0.1 mass % or more and 1 mass % or less, and may be 0.1 mass % or more and 0.8 mass % or less, or 0.1 mass % or more and 0.5 mass % or less. When the concentration of the cyclic imide component is in the range above, the decrease in capacity in a low temperature environment after storage of the lithium primary battery can be remarkably suppressed.

The mass ratio of the cyclic imide component to the organic silyl borate component contained in the liquid non-aqueous electrolyte may be 0.02 or more and 10 or less, and may be 0.02 or more and 5 or less, and 0.02 or more and 2 or less, 0.02 or more and 1 or less, 0.02 or more and 0.7 or less, 0.08 or more and 0.7 or less, 0.02 or more and 0.5 or less, 0.08 or more and 0.5 or less, or 0.1 or more and 0.5 or less. When the mass ratio is in the range above, the decrease in capacity in a low temperature environment after storage of the lithium primary battery can be further suppressed.

As described above, the cyclic imide component may be contained in the liquid non-aqueous electrolyte in the form of a salt. It is to be noted, however, in the present specification, the concentration or mass-based amount of the cyclic imide component in the liquid non-aqueous electrolyte is calculated as corresponding to the concentration or mass-based amount of the cyclic imide having a free NH group.

(Organic Silyl Borate Component)

In the present specification, the organic silyl borate component refers to a compound having an —O—Si— bond constituting a part of an ester in which at least one of the three OHs, which are ester-forming moieties of boric acid $B(OH)_3$, is esterified with an organic silyl group.

The organic silyl borate component has at least one organic silyl group, but in view of suppressing the side reaction, preferably includes an ester having two or more organic silyl groups, and more preferably includes a triester having three organic silyl groups.

The organic silyl group can have one, two or three organic groups. This organic group is an organic group bonded to a silicon atom in the organic silyl group. In view of enhancing the effect of suppressing the side reaction, the organic silyl group preferably has two or more organic groups, and more preferably has three organic groups. At least two of the organic groups bonded to the silicon atom may be the same, or all may be different.

The organic group is, for example, a hydrocarbon group which may have a substituent. The hydrocarbon group may be aliphatic, alicyclic, aromatic, or aromatic-aliphatic. The aliphatic and alicyclic hydrocarbon groups may be saturated or unsaturated.

As the aliphatic hydrocarbon group, an alkyl group, an alkenyl group, an alkynyl group, and a dienyl group are exemplified. The aliphatic hydrocarbon group may be linear or branched. The aliphatic hydrocarbon group has, for example, 10 or less carbon atoms, and may have 8 or less or 6 or less carbon atoms. The lower limit of the number of carbon atoms can be determined according to the type of the aliphatic hydrocarbon group, and is 1 or more for the alkyl group, and 2 or more for the alkenyl group and the alkynyl group. The dienyl group has 3 or more carbon atoms, and preferably has 4 or more carbon atoms. Specific examples of the aliphatic hydrocarbon group include methyl group, ethyl group, n-propyl group, isopropyl group, n-butyl group, isobutyl group, sec-butyl group, tert-butyl group, hexyl group, 2-ethylhexyl group, vinyl group, allyl group, propargyl group, and 1,3-butadien-1-yl group.

As the alicyclic hydrocarbon group, a cycloalkyl group, a cycloalkenyl group, a cycloalkadienyl group and the like are exemplified. Examples of the cycloalkyl group include cyclopentyl group, cyclohexyl group, and cyclooctyl group. Examples of the cycloalkenyl group include cyclohexenyl group and cyclooctenyl group. Examples of the cycloalkadienyl group include cyclopentadienyl group. The alicyclic hydrocarbon group has, for example, 4 or more and 20 or less carbon atoms, and may have 5 or more and 10 or less, or 5 or more and 8 or less carbon atoms. The alicyclic hydrocarbon group encompasses a condensed ring in which aromatic rings, such as benzene rings or pyridine rings, are condensed.

As the aromatic hydrocarbon group, an aryl group, a biphenyl group, a bisaryl group and the like are exemplified. Examples of the aryl group include a phenyl group and a naphthyl group. Examples of the bisaryl group include a monovalent group corresponding to bisarylalkane, bisarylether, bisarylthioether, and the like. The aromatic hydrocarbon group encompasses a condensed ring in which non-aromatic hydrocarbon rings or non-aromatic heterocyclic rings are condensed. The aromatic hydrocarbon group may be have, for example, 6 or more and 20 or less carbon atoms, and may have 6 or more and 16 or less, or 6 or more and 14 or less carbon atoms.

As the aromatic-aliphatic hydrocarbon group, for example, aralkyl group is exemplified. Examples of the aralkyl group include benzyl group and phenethyl group. The aromatic hydrocarbon group has, for example, 7 or more and 20 or less carbon atoms, and may have 7 or more and 14 or less carbon atoms.

As the substituent, an aliphatic hydrocarbon group, an alicyclic hydrocarbon group, a hydroxy group, a hydroxyalkyl group, an alkoxy group, an alkoxycarbonyl group, an acyl group, an acyloxy group, nitrile group, oxo group (=O), a halogen atom and the like are exemplified. Examples of the aliphatic hydrocarbon group include an alkyl group and an alkenyl group. Examples of the alicyclic hydrocarbon group include a cycloalkyl group. Examples of the halogen atom include fluorine atom, chlorine atom, bromine atom, and iodine atom. The organic group may has one substituent, or two or more substituents. When the organic group has two or more substituents, at least two of the substituents may be the same, or all may be different.

The liquid non-aqueous electrolyte may contain one kind of organic silyl borate component, or two or more kinds of organic silyl borate components.

Among the above organic groups, an alkyl group, an alkenyl group, and an aryl group are preferred. These organic groups encompass those having a substituent. In particular, an alkylsilyl borate, which is an organic silyl borate component having an alkyl group which may have a substituent, as an organic group, is more preferred. Among alkyl groups, an alkyl group having 1 to 6 carbon atoms, or an alkyl group having 1 to 4 carbon atoms is more preferred. As the substituent, a halogen atom is preferred, and at least one selected from fluorine atom and chlorine atom is more preferred.

The alkylsilyl borate may be a monoester, a diester, or the like, but it is preferable to use at least a triester. In the alkylsilyl borate, the alkylsilyl moiety may be a monoalkylsilyl moiety or a dialkylsilyl moiety, but it is preferable to use at least a borate ester having a trialkylsilyl moiety. In particular, it is more preferable to use at least tris(trialkylsilyl)borate. When such an alkylsilyl borate is contained, the side reaction tends to be suppressed, and the decrease in discharge capacity in a low temperature environment after storage can be more effectively suppressed. In each of the dialkylsilyl borate and the trialkylsilyl borate, at least two of the alkyl groups bonded to the silicon atom may be the same, or all may be different.

When the liquid non-aqueous electrolyte satisfies the above condition (a), the concentration of the organic silyl borate component in the liquid non-aqueous electrolyte is 5.5 mass % or less, and may be 5 mass % or less. When the concentration of the organic silyl borate component exceeds 5.5 mass %, the viscosity of the liquid non-aqueous electrolyte increases, and the battery internal resistance increases, and the decrease in discharge capacity in a low temperature environment after storage becomes significant. The concentration of the organic silyl borate component in the liquid non-aqueous electrolyte may be any value equal to or higher than the detection limit, and may 0.1 mass % or more, 0.5 mass % or more, 0.8 mass % or more, or 1 mass % or more. These upper limit and lower limit values may be combined in any combination.

During storage or discharge of the lithium primary battery, the organic silyl borate component is consumed for the surface film formation and the like in the lithium primary battery, and the concentration of the organic silyl borate component in the liquid non-aqueous electrolyte varies. The concentration of the organic silyl borate component in the liquid non-aqueous electrolyte used for fabrication or manufacturing of the lithium primary battery is preferably set to 0.1 mass % or more, and more preferably set to 0.5 mass % or more, 0.8 mass % or more, or 1 mass % or more. In this case, the decrease in capacity after the lithium primary battery is stored can be remarkably suppressed. The concentration of the organic silyl borate component in the liquid non-aqueous electrolyte used for fabrication or manufacturing of the lithium primary battery is preferably set to 5.5 mass % or less, or 5 mass % or less. In this case, the excessive increase in the viscosity of the liquid non-aqueous electrolyte can be suppressed, and the decrease in capacity in a low temperature environment after storage of the lithium primary battery can be remarkably suppressed. These upper limit and lower limit values may be combined in any combination.

When the liquid non-aqueous electrolyte satisfies the above condition (b), the concentration of the organic silyl borate component in the liquid non-aqueous electrolyte is 0.1 mass % or more and 5.5 mass % or less, and may be 0.1 mass % or more and 5 mass % or less, 0.5 mass % or more and 5.5 mass % or less, 0.5 mass % or more and 5 mass % or less, 0.8 mass % or more and 5.5 mass % or less, 0.8 mass % or more and 5 mass % or less, 1 mass % or more and 5.5 mass % or less, or 1 mass % or more and 5 mass % or less. When the concentration of the organic silyl borate component is in such a range, the decrease in capacity in a low temperature environment after storage of the lithium primary battery can be remarkably suppressed.

(Non-Aqueous Solvent)

The non-aqueous solvent may be a typical organic solvent used in a liquid non-aqueous electrolyte of a lithium primary battery. Examples of the non-aqueous solvent include an ether, an ester, and a carbonic acid ester. Specific examples of the non-aqueous solvent include dimethyl ether, γ-butyl lactone, propylene carbonate, ethylene carbonate, and 1,2-dimethoxyethane. The liquid non-aqueous electrolyte may contain one kind or two or more kinds of non-aqueous solvents.

In view of improving discharge characteristics of the lithium primary battery, the non-aqueous solvent preferably contains a cyclic carbonic acid ester, which has a high boiling point, and a chain ether, which exhibits a low viscosity even in a low temperature environment. The cyclic carbonic acid ester preferably includes at least one selected from the group consisting of propylene carbonate (PC) and ethylene carbonate (EC), of which PC is particularly preferred. The chain ether preferably has a viscosity of 1 mPa s or less, at 25° C., and particularly preferably includes dimethoxyethane (DME). The viscosity of the non-aqueous solvent can be measured using a small sample viscometer m-VROC available from RheoSense, Inc., in a 25° C. environment, at a shear rate of 10,000 (1/s).

(Lithium Salt)

The liquid non-aqueous electrolyte may contain a lithium salt other than the cyclic imide component. The lithium salt may be, for example, a lithium salt used as a solute in a lithium primary battery. Examples of such a lithium salt include $LiCF_3SO_3$, $LiClO_4$, $LiBF_4$, $LiPF_6$, $LiRaSO_3$ where $R_a$ is a fluoroalkyl group having 1 to 4 carbon atoms, $LiFSO_3$, $LiN(SO_2R_b)(SO_2R_c)$ where $R_b$ and $R_c$ are independently a fluoroalkyl group having 1 to 4 carbon atoms, $LiN(FSO_2)_2$, $LiPO_2F_2$, $LiB(C_2O_4)_2$, and $LiBF_2(C_2O_4)$. The liquid non-aqueous electrolyte may contain one kind or two or more kinds of these lithium salts.

(Others)

The concentration of lithium ions (total lithium salt concentration) in the liquid non-aqueous electrolyte is, for example, 0.2 to 2.0 mol/L, and may be 0.3 to 1.5 mol/L.

The liquid non-aqueous electrolyte may contain an additive, if necessary. Examples of the additive include propane sultone and vinylene carbonate. The total concentration of the additive in the liquid non-aqueous electrolyte is, for example, 0.003 to 5 mol/L.

(Separator)

The lithium primary battery usually includes a separator interposed between the positive electrode and the negative electrode. The separator may be a porous sheet formed of an electrically insulating material having resistance against the internal environment of the lithium primary battery. Specific examples thereof include a nonwoven fabric made of synthetic resin, a microporous film made of synthetic resin, and a laminate of these.

Examples of the synthetic resin used for the nonwoven fabric include polypropylene, polyphenylene sulfide, and polybutylene terephthalate. Examples of the synthetic resin used for the microporous film include a polyolefin resin, such as polyethylene, polypropylene, and ethylene-propylene copolymer. The microporous film may contain inorganic particles, if necessary.

The thickness of the separator is, for example, 5 μm or more and 100 μm or less.

The structure of the lithium primary battery is not limited. The lithium primary battery may be a coin-type battery including a laminated electrode group formed by laminating a disc-shaped positive electrode to a disc-shaped negative electrode with a separator interposed therebetween. It may be a cylindrical-type battery including a wound electrode group formed by spirally winging a belt-like positive electrode and a belt-like negative electrode with a separator interposed therebetween.

FIG. 1 is a front view, partially in section, of a lithium primary battery according to one embodiment of the present disclosure. In a lithium primary battery 10, an electrode group formed by winding a positive electrode 1 and a negative electrode 2 with a separator 3 interposed therebetween is housed, together with a liquid non-aqueous electrolyte, in a battery case 9. A sealing plate 8 is attached at the opening of the battery case 9. A positive electrode lead 4 connected to a current collector Ta of the positive electrode 1 is connected to the sealing plate 8. A negative electrode lead 5 connected to the negative electrode 2 is connected to the case 9. On the upper and lower sides of the electrode group, an upper insulating plate 6 and a lower insulating plate 7 are respectively disposed, in order to prevent an internal short circuit.

[Method of Manufacturing Lithium Primary Battery]

The lithium primary battery can be manufactured by housing the positive electrode, the negative electrode, and the liquid non-aqueous electrolyte in the battery case. The method for manufacturing a lithium primary battery of the present disclosure includes at least a step of preparing a liquid non-aqueous electrolyte that contains a cyclic imide component and an organic silyl borate component and satisfies the above condition (b). In the lithium primary battery obtained by the manufacturing method including such a step, it is possible to remarkably suppress the decrease in discharge capacity in a low temperature environment after storage. In the manufacturing method of a lithium primary battery, any known manufacturing steps can be adopted depending on the type and like of the battery, except for the step of preparing the liquid non-aqueous electrolyte.

EXAMPLE

The present disclosure will be specifically described below based on Examples and Comparative Examples, but the present disclosure is not limited to the following Examples.

Examples 1 to 5 and Comparative Examples 1 to 7

(1) Production of Positive Electrode

To produce a positive electrode, first, to 100 parts by mass of electrolytic manganese dioxide, 5 parts by mass of Ketjen black serving as a conductive agent, 5 parts by mass of polytetrafluoroethylene serving as a binder, and an appropriate amount of pure water were added and kneaded, to prepare a positive electrode material mixture in a wet state. Next, the positive electrode material mixture was filled in a positive electrode current collector formed of a 0.1-mm-thick expanded metal made of stainless steel (SUS444), to prepare a positive electrode precursor. Thereafter, the positive electrode precursor was dried and rolled with a roll press until the thickness reached 0.4 mm, and then, cut into a sheet of 2.2 cm long and 1.5 cm wide, to obtain a positive electrode. Subsequently, part of the filled positive electrode material mixture was peeled off, and a tab lead made of SUS444 was resistance welded to the exposed portion of the positive electrode current collector.

(2) Production of Negative Electrode

A metal lithium foil having a thickness of 300 μm was cut in a size of 4 cm long and 2.5 cm wide, to obtain a negative electrode. A nickel tab lead was connected to the negative electrode at a predetermined position by pressure welding.

(3) Formation of Electrode Group

A separator was placed on the positive electrode and wound together with the negative electrode such that the separator faces the negative electrode, to form an electrode group. The separator used here was a 25-μm-thick polypropylene microporous film.

(4) Preparation of Liquid Non-Aqueous Electrolyte

PC, EC and DME were mixed in a volume ratio of 4:2:4. To the resultant mixture, $LiCF_3SO_3$ was dissolved at a concentration of 0.5 mol/L, and phthalimide as a cyclic imide component and tris(trimethylsilyl)borate as an organic silyl borate component were dissolved, each at a concentration shown in Table 1. In this way, a liquid non-aqueous electrolyte was prepared. In Table 1, the cyclic imide component is denoted as a first component, and the organic silyl borate component is denoted as a second component.

(5) Fabrication of Lithium Primary Battery

The electrode group was housed in a tubular aluminum laminated bag of 9 cm long and 6 cm wide, with part of each of the tab leads connected to the positive electrode and the negative electrode exposed from the bag, and the opening on the tab lead side was sealed. Then, 0.5 mL of the liquid electrolyte was injected through the opening on the side opposite to the tab lead, and the opening was sealed by vacuum heat sealing. In this way, a lithium primary battery for testing was produced. The design capacity of the lithium primary battery was 301 mAh/g.

In the lithium primary battery of Examples, the amount of sulfur atoms derived from the sulfate contained in the positive electrode material mixture was 0.05 parts by mass or more and 1.25 parts by mass or less, relative to 100 parts by mass of manganese atoms contained in the positive electrode material mixture. In the lithium primary battery of Examples, the median particle diameter of $LixMnO_2$ contained in the positive electrode was 25 μm to 27 μm, and the BET specific surface area thereof was 38 to 42 $m^2$/g.

(6) Evaluation (6-1) Discharge Capacity after Storage

The lithium primary battery immediately after fabrication was discharged by a capacity corresponding to 25% of the design capacity (C0), and then stored at 70° C. for 80 days. Next, the lithium primary battery after storage was placed in a constant temperature bath at –30° C., and discharged at a current of 4.5 mA per unit mass (g) of manganese dioxide until the battery voltage reached 2 V, at which point the discharge capacity (mAh/g) was measured. The ratio (%) of the discharge capacity in each lithium primary battery to the discharge capacity in the lithium primary battery of Comparative Example 7, which was taken as 100%, was determined as a discharge capacity after storage (relative value). A smaller discharge capacity (%) indicates that the discharge capacity in a low temperature environment after storage has decreased to be smaller.

The results of Examples and Comparative Examples are shown in Table 1. In Table 1, E1 to E5 represent Examples 1 to 5, and R1 to R7 represent Comparative Examples 1 to 7.

TABLE 1

| | First component Concentration (mass %) | Second component Concentration (mass %) | Mass ratio (First component/ Second component) | Discharge capacity after storage (%) |
|---|---|---|---|---|
| E1 | 0.5 | 1 | 0.50 | 136 |
| E2 | 0.1 | 0.1 | 1.00 | 108 |
| E3 | 0.5 | 5 | 0.10 | 142 |
| E4 | 0.1 | 5 | 0.02 | 118 |
| E5 | 0.8 | 5 | 0.16 | 122 |
| R1 | 0.5 | — | — | 85 |
| R2 | 0.5 | 0.01 | 50.00 | 87 |
| R3 | 0.5 | 10 | 0.05 | 72 |
| R4 | 0.01 | 1 | 0.01 | 100 |
| R5 | 1.5 | 1 | 1.50 | 82 |

17

TABLE 1-continued

| | First component Concentration (mass %) | Second component Concentration (mass %) | Mass ratio (First component/ Second component) | Discharge capacity after storage (%) |
|---|---|---|---|---|
| R6 | — | 1 | — | 101 |
| R7 | — | — | — | 100 |

When the liquid non-aqueous electrolyte did not contain the second component and contained the first component, the discharge capacity after storage was 85%, which was a significant decrease in capacity as compared to when the liquid non-aqueous electrolyte contained neither the first component nor the second component (comparison between R1 and R7). When the liquid non-aqueous electrolyte did not contain the first component and contained the second component, the discharge capacity after storage was 101%, which was almost the same as that when the liquid non-aqueous electrolyte contained neither the first component nor the second component (comparison between R6 and R7). From these results, it can be inferred that the capacity decrease ratio after storage when the liquid non-aqueous electrolyte contains both the first component and the second component would be 85%+1%=86%. However, in reality, when the liquid non-aqueous electrolyte contained both the first component and the second component, the discharge capacity after storage was 136% (E1), and the decrease in capacity was suppressed considerably as compared to the inferred value of 86%. Such an effect is considered to be clearly due to the synergistic effect of the first component and the second component.

The effect as above in Examples can be obtained when the liquid non-aqueous electrolyte satisfies at least one of the aforementioned conditions (a) and (b) (comparison between E1 to 5 and R2 to 5).

INDUSTRIAL APPLICABILITY

In the lithium primary battery of the present disclosure, the decrease in discharge capacity in a low temperature environment after storage can be suppressed. Therefore, the lithium primary battery can be suitably used, for example, as a main power source for various meters and a memory backup power source. The applications of the lithium primary battery, however, are not limited thereto.

REFERENCE SIGNS LIST 1 positive electrode
1a positive electrode current collector
2 negative electrode
3 separator
4 positive electrode lead
5 negative electrode lead
6 upper insulating plate
7 lower insulating plate
8 sealing plate
9 battery case
10 lithium primary battery

The invention claimed is:

1. A lithium primary battery, comprising:
a positive electrode; a negative electrode; and a liquid non-aqueous electrolyte, wherein
the positive electrode contains a positive electrode material mixture including $LixMnO_2$ where $0 \leq x \leq 0.05$ and a sulfate,

18 an amount of sulfur atoms contained in the positive electrode material mixture is 0.05 parts by mass or more and 3 parts by mass or less, relative to 100 parts by mass of manganese atoms contained in the positive electrode material mixture,
the negative electrode contains at least one selected from the group consisting of metal lithium and a lithium alloy,
the liquid non-aqueous electrolyte contains an additive containing a cyclic imide component and an additive containing an organic silyl borate component,
a concentration of the cyclic imide component in the liquid non-aqueous electrolyte is 0.1 mass % or more and 1 mass % or less, and
a concentration of the organic silyl borate component in the liquid non-aqueous electrolyte is 0.1 mass % or more and 5.5 mass % or less.

2. The lithium primary battery according to claim 1, wherein a mass ratio of the cyclic imide component to the organic silyl borate component contained in the liquid non-aqueous electrolyte is 0.02 or more and 10 or less.

3. The lithium primary battery according to claim 1, wherein the cyclic imide component includes at least one selected from the group consisting of phthalimide and a N-substituted phthalimide.

4. The lithium primary battery according to claim 1, wherein the cyclic imide component includes at least phthalimide.

5. The lithium primary battery according to claim 1, wherein
the organic silyl borate component includes a triester having three organic silyl groups, and
each of the organic silyl groups has three organic groups.

6. The lithium primary battery according to claim 5, wherein each of the organic groups is an alkyl group.

7. The lithium primary battery according to claim 6, wherein the alkyl group has 1 to 4 carbon atoms.

8. The lithium primary battery according to claim 1, wherein
the positive electrode material mixture includes particles of $LixMnO_2$, and a median particle diameter of the particles of $LixMnO_2$ is 10 μm or more and 40 μm or less.

9. The lithium primary battery according to claim 1, wherein a BET specific surface area of $LixMnO_2$ is 20 m$^2$/g or more and 50 m$^2$/g or less.

10. The lithium primary battery according to claim 1, wherein
the positive electrode includes a current collector with pores, and the positive electrode material mixture filled in the current collector,
the current collector includes a stainless steel, and
the positive electrode has a thickness of 300 μm or more and 900 μm or less.

11. The lithium primary battery according to claim 1, which further comprises a continuous tape, wherein
the continuous tape includes a resin base material and an adhesive layer,
the negative electrode includes a metal foil,
the metal foil is a metal lithium foil or a lithium alloy foil,
the metal foil has a shape having a longitudinal direction and a lateral direction,
the continuous tape is attached on at least one principal surface of the negative electrode,
a longitudinal direction of the continuous tape is along the longitudinal direction of the negative electrode.

12. The lithium primary battery according to claim 1, wherein the organic silyl borate component includes tris (trimethylsilyl) borate.

13. A lithium primary battery, comprising:

a positive electrode; a negative electrode; and a liquid non-aqueous electrolyte, wherein the positive electrode contains a positive electrode material mixture including $Li_xMnO_2$ where $0 \leq x \leq 0.05$, the negative electrode contains at least one selected from the group consisting of metal lithium and a lithium alloy, the liquid non-aqueous electrolyte contains an additive containing a cyclic imide component and an additive containing an organic silyl borate component, the cyclic imide component includes at least one selected from the group consisting of phthalimide and a N-substituted phthalimide, the organic silyl borate component includes tris(trimethylsilyl) borate, a concentration of the cyclic imide component in the liquid non-aqueous electrolyte is 0.1 mass % or more and 1 mass % or less, a concentration of the organic silyl borate component in the liquid non-aqueous electrolyte is 0.1 mass % or more and 5.5 mass % or less, and a mass ratio of the cyclic imide component to the organic silyl borate component contained in the liquid non-aqueous electrolyte is 0.1 or more and 0.5 or less.

\* \* \* \* \*